US006252346B1

(12) United States Patent
Turner et al.

(10) Patent No.: US 6,252,346 B1
(45) Date of Patent: Jun. 26, 2001

(54) METAL MATRIX COMPOSITE INTEGRATED LAMP HEAD

(75) Inventors: Brian P. Turner, Damascus; Kent Kipling; Bruce Shanks, both of Gaithersburg, all of MD (US); Malcolm Smith, Alexandria, VA (US)

(73) Assignee: Fusion Lighting, Inc., Rockville, MD (US)

( * ) Notice: Subject to any disclaimer, the term of this patent is extended or adjusted under 35 U.S.C. 154(b) by 0 days.

(21) Appl. No.: 09/616,994

(22) Filed: Jul. 14, 2000

Related U.S. Application Data

(62) Division of application No. 09/228,230, filed on Jan. 11, 1999, now Pat. No. 6,137,237
(60) Provisional application No. 60/109,591, filed on Nov. 23, 1998, provisional application No. 60/102,968, filed on Oct. 2, 1998, provisional application No. 60/099,288, filed on Sep. 4, 1998, provisional application No. 60/091,920, filed on Jul. 7, 1998, provisional application No. 60/083,093, filed on Apr. 28, 1998, provisional application No. 60/071,285, filed on Jan. 13, 1998, provisional application No. 60/071,284, filed on Jan. 13, 1998, and provisional application No. 60/071,192, filed on Jan. 13, 1998.

(51) Int. Cl.[7] ........................................... H01J 1/62
(52) U.S. Cl. .......................... 313/493; 313/634; 313/575; 315/248
(58) Field of Search ................................... 313/493, 634, 313/636, 575; 315/248, 344, 39

(56) References Cited

U.S. PATENT DOCUMENTS

| Re. 21,150 | 7/1939 | Lepel ..................................... 176/122 |
| Re. 32,527 | 10/1987 | Shinkawa et al. ...................... 331/99 |
| 843,534 | 2/1907 | Hewitt . |

(List continued on next page.)

FOREIGN PATENT DOCUMENTS

| 38 42 756 | 6/1990 | (DE) . |
| 0309270 | 3/1989 | (EP) . |
| 0357453 | 3/1990 | (EP) . |
| 0457242 | 11/1991 | (EP) . |
| 0458546 | 11/1991 | (EP) . |
| 2170668 | 8/1986 | (GB) . |
| 8-148127 | 6/1996 | (JP) . |
| 93/21655 | 10/1993 | (WO) . |
| 97/45858 | 12/1997 | (WO) . |

OTHER PUBLICATIONS

Godyak, V.A., et al., "Electrical and light characteristics of RF–inductive fluorescent lamps", *J. of the Illuminating Engineering Society*, p 40–44(Winter 1994), presented at the 1993 IESNA Annual Conference.

Piejak, R.B. et al., "A simple analysis of an inductive RF discharge", *Plasma Sources Sci. Technol.* 1:179–186 (1992).

Thomson, J.J., "On the discharge of electricity through exhausted tubes without electrodes", *Phil. Mag.* S.5., vol. 32, No. 197, p. 321–464 (Oct. 1891), The London, Edinburgh, and Dublin Philosophical Magazine and Journal of Science.

(List continued on next page.)

*Primary Examiner*—Haissa Philogene
(74) *Attorney, Agent, or Firm*—Paul E. Steiner

(57) ABSTRACT

An integrated lamp head for an electrodeless lamp includes a metal-matrix composite enclosure, an insulating ceramic encased by the metal-matrix enclosure, the insulating ceramic having an interior surface, and an excitation structure integrally formed on the interior surface of the insulating ceramic. The excitation structure may include an excitation coil such as a wedding ring shaped excitation coil or a coil having a cross sectional shape similar to an upper-case Greek letter omega. The integrated lamp head optionally includes a pre-formed connection from an exterior portion of the integrated lamp head to the excitation structure and/or a conductive insert in an area of a solder connection point.

5 Claims, 16 Drawing Sheets

U.S. PATENT DOCUMENTS

| | | |
|---|---|---|
| 1,854,912 | 4/1932 | Spaeth . |
| 2,333,052 | 10/1943 | Smith .................................. 176/122 |
| 3,860,854 | 1/1975 | Hollister ............................... 315/248 |
| 3,943,404 | 3/1976 | McNeil et al. ......................... 315/39 |
| 4,007,392 | 2/1977 | Velfells et al. ....................... 313/154 |
| 4,010,400 | 3/1977 | Hollister ............................... 315/248 |
| 4,016,507 | 4/1977 | Havens .................................. 331/96 |
| 4,021,727 | 5/1977 | Fellows ............................... 324/20 R |
| 4,070,603 | 1/1978 | Regan et al. ......................... 315/248 |
| 4,127,797 | 11/1978 | Perper .............................. 315/209 R |
| 4,206,387 | 6/1980 | Kramer et al. ....................... 315/248 |
| 4,245,178 | 1/1981 | Justice ................................. 315/248 |
| 4,380,744 | 4/1983 | Kantorowicz .................... 331/107 R |
| 4,427,920 | 1/1984 | Proud et al. .......................... 315/248 |
| 4,484,156 | 11/1984 | Khanna et al. .......................... 331/60 |
| 4,547,750 | 10/1985 | Torizuka et al. ....................... 331/99 |
| 4,613,796 | 9/1986 | Bay ..................................... 315/219 |
| 4,705,987 | 11/1987 | Johnson ............................... 313/634 |
| 4,736,454 | 4/1988 | Hirsch .................................. 455/129 |
| 4,775,845 | 10/1988 | McCoy ................................... 331/96 |
| 4,783,615 | 11/1988 | Dakin .................................. 315/248 |
| 4,812,702 | 3/1989 | Anderson ............................ 313/153 |
| 4,864,194 | 9/1989 | Kobayashi et al. ................... 315/248 |
| 4,871,008 * | 10/1989 | Dwivedi et al. ......................... 164/6 |
| 4,894,590 | 1/1990 | Witting ................................ 315/248 |
| 4,894,591 | 1/1990 | Witting ................................ 315/248 |
| 4,906,946 | 3/1990 | Mekata et al. ......................... 331/99 |
| 4,908,492 | 3/1990 | Okamoto et al. ............... 219/121.52 |
| 4,922,157 * | 5/1990 | Engen et al. ......................... 315/248 |
| 4,922,210 | 5/1990 | Flachenecker et al. ............. 331/167 |
| 4,926,791 | 5/1990 | Hirose et al. ........................ 118/723 |
| 4,949,053 | 8/1990 | Havens .................................. 331/96 |
| 4,982,168 | 1/1991 | Sigmon et al. ................ 331/107 SL |
| 5,039,903 | 8/1991 | Farrall ................................. 113/160 |
| 5,070,277 | 12/1991 | Lapatovich .......................... 315/248 |
| 5,072,157 | 12/1991 | Greb et al. ........................... 315/248 |
| 5,084,801 | 1/1992 | El-Hamamsy et al. .............. 315/248 |
| 5,107,229 | 4/1992 | Cheesman ........................... 331/185 |
| 5,118,997 | 6/1992 | El-Hamamsy ....................... 315/248 |
| 5,159,346 | 10/1992 | Bosch et al. ......................... 342/175 |
| 5,214,357 | 5/1993 | Dakin et al. ......................... 315/248 |
| 5,259,436 | 11/1993 | Yun et al. ............................... 164/97 |
| 5,289,139 | 2/1994 | Fiedziuszko et al. ................. 331/56 |
| 5,339,047 | 8/1994 | Mizan et al. ......................... 330/286 |
| 5,367,226 | 11/1994 | Ukegawa et al. .................... 315/248 |
| 5,387,850 | 2/1995 | Bray et al. ........................... 315/248 |
| 5,397,966 | 3/1995 | Vrionis et al. ....................... 315/248 |
| 5,404,076 | 4/1995 | Dolan et al. ......................... 313/572 |
| 5,448,137 | 9/1995 | Bobel .................................. 315/244 |
| 5,483,206 | 1/1996 | Lohninger ..................... 331/107 SL |
| 5,498,928 | 3/1996 | Lapatovich et al. ................... 315/39 |
| 5,498,937 | 3/1996 | Körber et al. ....................... 315/248 |
| 5,500,574 | 3/1996 | Popov et al. ........................ 315/248 |
| 5,541,482 | 7/1996 | Siao .................................... 315/248 |
| 5,570,502 | 11/1996 | Sawtell et al. ...................... 29/527.6 |
| 5,587,629 | 12/1996 | Gornstein ........................ 315/200 R |
| 5,616,421 | 4/1997 | Sawtell et al. ....................... 428/614 |
| 5,621,266 | 4/1997 | Popov et al. ........................... 313/46 |
| 5,637,961 | 6/1997 | Ishii et al. ....................... 315/111.51 |
| 5,661,365 | 8/1997 | Turner ................................. 313/637 |
| 5,682,080 | 10/1997 | Dolan et al. ........................ 313/570 |
| 5,734,221 * | 3/1998 | Os ....................................... 313/113 |
| 5,834,895 | 11/1998 | Dolan et al. ........................ 315/248 |
| 5,834,904 | 11/1998 | Waymouth .......................... 315/248 |
| 5,841,243 | 11/1998 | Hooper ................................ 315/248 |
| 5,841,244 | 11/1998 | Hooper ................................ 315/248 |
| 5,852,339 | 12/1998 | Hamilton et al. ..................... 313/11 |
| 5,886,478 | 5/1999 | Smith et al. ......................... 315/248 |
| 5,886,479 | 5/1999 | Kennedy et al. .................... 315/248 |
| 5,962,986 | 10/1999 | Morse ................................. 315/248 |
| 5,990,632 | 11/1999 | Smith et al. ......................... 315/248 |
| 6,017,221 | 1/2000 | Flamm ................................ 437/225 |

OTHER PUBLICATIONS

Wharmby, D., "Review of electrodeless discharges for lighting", Thorn Lighting Limited Presentation (Sep. 5, 1989).

Wharmby, D., "Electrodeless discharges for lighting", GE Lighting Europe Presentation (1994).

Wharmby, D.O., Ph.D., "Electrodeless lamps for lighting: A review", IEEE Proceedings—A, vol. 140, No. 6 (Nov. 1993).

Hagen, Jon B., "Radio–Frequency Electronics: Circuits and Applications", pp. 115–123, Cambridge University Press (1996).

Kipling, Kent, et al., "Low Wattage, Solid State Electrodeless Lamp Having High Brightness", *Journal of Technical Disclosure,* (Oct. 1, 1998).

"Low Wattage Solid State Electrodeless Lamp Having High Brightness", *Research Disclosure,* pp. 1341–1344 (Oct. 1998).

Martin, Jose L.J. and González, Francisco J.O., "Accurate Linear Oscillator Analysis and Design", *Microwave Journal,* pp. 22, 24, 26, 28, 30–32, 37 (entire article) (Jun. 1996).

Raab. Frederick, "Class–F Power Amplifiers With Maximally Flat Waveforms", *IEEE Transactions on Microwave Theory and Techniques,* vol. 45(11):2007–2012 (Nov. 1997).

PCT Application No. PCT/US99/00047.

* cited by examiner

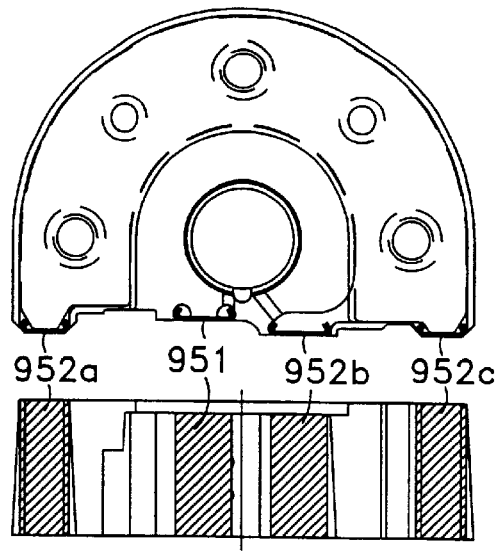
Fig. 45
Fig. 46
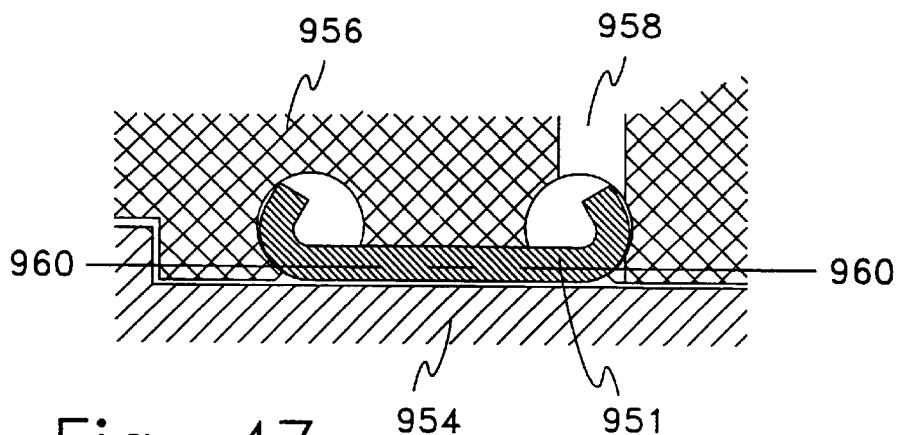
Fig. 47
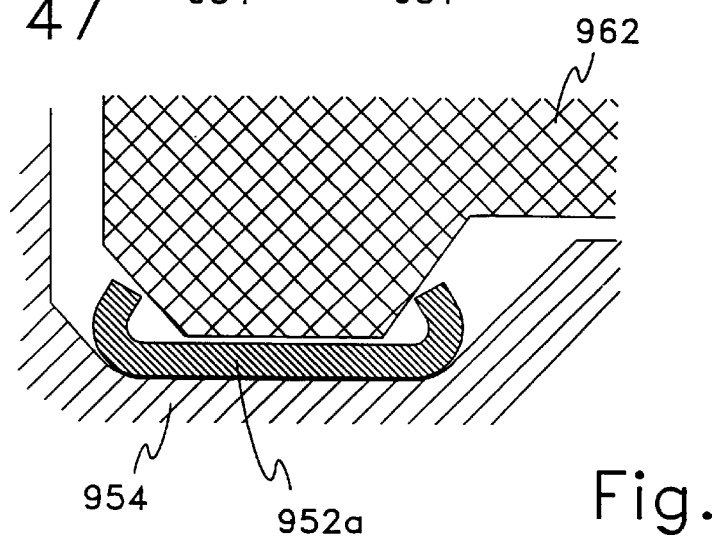
Fig. 48

METAL MATRIX COMPOSITE INTEGRATED LAMP HEAD

CROSS REFERENCE TO RELATED APPLICATIONS

This application is a divisional of application Ser. No. 09/228,230 filed Jan. 11, 1999, now U.S. Pat. No. 6,137,237, and claims priority to provisional application Nos. 60/071,192, 60/071,284, and 60/071,285, all filed Jan. 13, 1998, 60/083,093, filed Apr. 28, 1998, 60/091,920, filed Jul. 7, 1998, 60/099,288, filed Sep. 4, 1998, 60/102,968, filed Oct. 2, 1998, and 60/109,591, filed Nov. 23, 1998, each of which is herein incorporated by reference in its entirety.

BACKGROUND

1. Field of the Invention

The invention relates generally to discharge lamps. The invention relates more specifically to novel lamp configurations and to an improved method of manufacturing an electrodeless lamp.

2. Related Art

In general, the present invention relates to the type of lamp disclosed in U.S. Pat. No. 5,404,076, as well as U.S. Pat. No. 5,903,091, each of which is herein incorporated by reference in its entirety.

Electrodeless lamps are known in the art. Such lamps may be characterized according to the type of discharge they produce. Electrodeless discharges may be classified as either E discharges, microwave discharges, travelling wave discharges, or H discharges.

FIG. 1 is a schematic diagram of a conventional electrodeless lamp which produces an E discharge. A power source 1 provides power to a capacitor 2. A gas-filled vessel 3 is placed between the plates of the capacitor 2. E discharges in electrodeless lamps are similar to arc discharges in an electroded lamp, except that current is usually much less in an E discharge. Once breakdown of the gas to its ionized or plasma state is achieved, current flows through the capacitance of the vessels walls between the plates of the capacitor 2, thereby producing a discharge current in the plasma.

FIG. 2 is a schematic diagram of a conventional electrodeless lamp which produces a microwave discharge. A microwave power source 11 provides microwave energy which is directed by a waveguide 12 to a microwave cavity 14 which houses a gas-filled bulb 13. The microwave energy excites the fill in the bulb 13 and produces a plasma discharge. In a microwave discharge, the wavelength of the electromagnetic field is comparable to the dimensions of the exciting structure, and the discharge is excited by both E and H components of the field.

FIG. 3 is a schematic diagram of a conventional electrodeless lamp which produces a travelling wave discharge. A power source 21 provides power to a launcher 22. A gas-filled vessel 23 is disposed in the launcher 22. The gap between the electrodes of the launcher 22 provides an E field which launches a surface wave discharge. The plasma in the vessel 23 is the structure along which the wave is then propagated.

FIG. 4 is a schematic diagram of a conventional electrodeless lamp which produces an H discharge. Electrodeless lamps which produce an H discharge are also referred to as inductively coupled lamps. As shown in FIG. 4, one example for a conventional inductively coupled lamp includes a low frequency power source 31 providing power to a coil 32 which is wound around a gas-filled vessel 33. The alternating current around the coil 32 causes a changing magnetic field, which induces an electric field which drives a current in the plasma. In effect, the plasma can be analyzed as a single turn secondary to the coil 32. An H discharge is characterized by a closed electrical field, which in many examples forms a visible donut-shaped plasma discharge.

A number of parameters characterize highly useful sources of light. These include spectrum, efficiency, brightness, economy, durability (working life), and others. For example, a highly efficient, low wattage light source with a long working life, particularly a light source with high brightness, represents a highly desirable combination of operating features. Electrodeless lamps have the potential to provide a much longer working life than electroded lamps. However, low wattage electrodeless lamps have found only limited commercial applications.

SUMMARY

Various aspects, features, advantages, and applications of electrodeless lamps utilizing the novel integrated lamp head of the present invention may be understood with reference to the parent '230 application.

According to one aspect of the invention, an integrated lamp head for an electrodeless lamp includes a metal-matrix composite body, an insulating material encased by the metal-matrix body, the insulating material having an interior surface, and an excitation structure integrally formed on the interior surface of the insulating material. The insulating material may be, for example, a ceramic. The integrally formed excitation structure may include, for example, an excitation coil. Preferably, the integrally formed excitation structure comprises a wedding ring shape excitation coil. The integrally formed excitation structure may also include a cross-sectional shape generally corresponding to the upper-case Greek letter omega. According to another aspect of the invention, the integrally formed excitation structure comprises a pre-formed connection from an exterior portion of the integrated lamp head to the excitation structure.

The foregoing aspects of the invention are achieved individually and in combination. The invention should not be construed as requiring two or more of the foregoing aspects unless expressly required by the claims.

BRIEF DESCRIPTION OF THE DRAWINGS

The invention will be better understood with reference to the accompanying figures, wherein:

FIG. 45 is a schematic, top view of a lamp head according to another example of the invention.

FIG. 46 is a schematic, front view of the lamp head.

FIG. 47 is an enlarged, fragmented, cross-sectional view of the insert positioned in a mold prior to infiltration of the aluminum.

FIG. 48 is an enlarged, fragmented, cross-sectional view of the insert positioned in the mold prior to infiltration of aluminum.

DESCRIPTION

Figure 1:
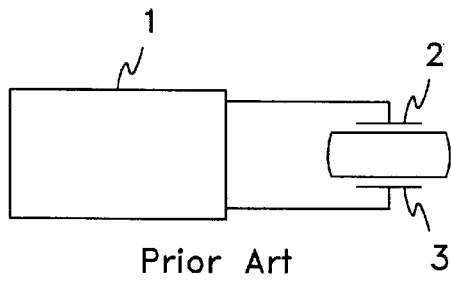
FIG. 1 is a schematic diagram of a conventional electrodeless lamp which produces an E discharge.
Figure 3:
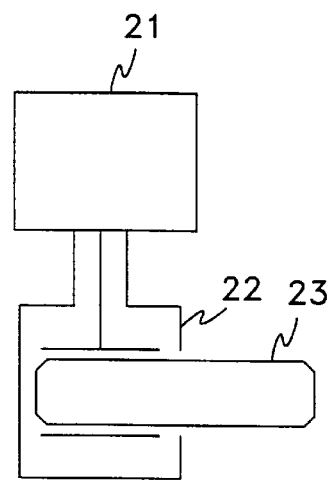
FIG. 3 is a schematic diagram of a conventional electrodeless lamp which produces a travelling wave discharge.
Figure 2:
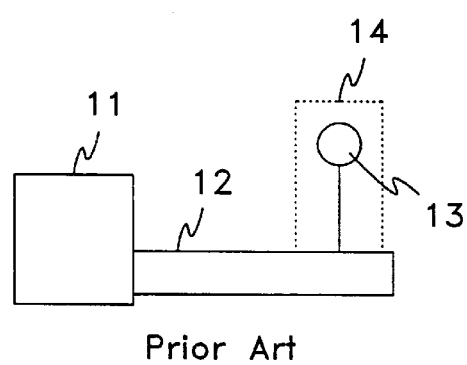
FIG. 2 is a schematic diagram of a conventional electrodeless lamp which produces a microwave discharge.
Figure 4:
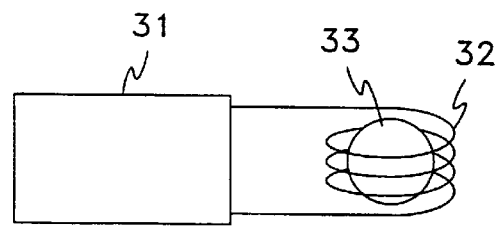
FIG. 4 is a schematic diagram of a conventional electrodeless lamp which produces an H discharge.
Figure 5:
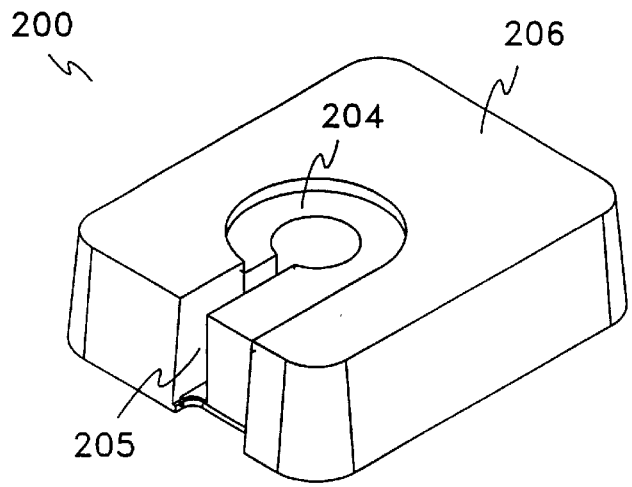
FIG. 5 is a perspective view of an integrated lamp head according to a first example of the invention.

With reference to FIGS. 5–8, an integrated lamp head 200 includes an enclosure 206 encasing a ceramic insert 204. Overall dimensions for the lamp head 200 are approximately 40 mm wide×50 mm long×15 mm deep. As can best be seen in FIG. 8, the enclosure 206 includes aluminum (Al) 206a and aluminum silicon carbide (AlSiC) 206b. The integrated lamp head 200 is a monolithic structure which comprises a metal matrix composite holding an electrically insulating ceramic. The integrated lamp head 200 may be manufactured, for example, by the fabrication methods described in U.S. Pat. No. 5,570,502 (entitled "Fabricating Metal Matrix Composites Containing Electrical Insulators"), U.S. Pat. No. 5,259,436 (entitled "Fabrication of Metal Matrix Composites by Vacuum Die Casting"), U.S. Pat. No. 5,047,182 (entitled "Complex Ceramic and Metallic Shapes by Low Pressure Forming and Sublimative Drying"), U.S. Pat. No. 5,047,181 (entitled "Forming of Complex High Performance Ceramic and Metallic Shapes"), U.S. Pat. No. 4,904,411 (entitled "Highly loaded, Pourable Suspensions of Particulate Materials"), U.S. Pat. No. 4,882,304 (entitled "Liquefaction of Highly Loaded Composite Systems"), and U.S. Pat. No. 4,816,182 (entitled "Liquefaction of Highly Loaded Particulate Suspensions"), each of which is herein incorporated by reference in its entirety.

In general terms, the integrated lamp head 200 is fabricated according to the following process. A silicon carbide (SiC) pre-form and a boron nitride (BN) insert 204 are appropriately positioned in a die cavity. Liquid phase aluminum (or aluminum alloy) is forced into the die cavity (e.g. by vacuum pressure), wherein the aluminum infiltrates the porous SiC pre-form and fills any otherwise open spaces in the die cavity. The liquid phase aluminum is solidified, thereby forming a die cast structure having metal matrix composite around and through the porous SiC pre-form and BN insert 204. Aluminum solidifies in a gap between the BN insert 204 and the AlSiC 206b, thereby forming a stove pipe 206c as described in the parent application.

The die cast structure is then machined to form the lamp head 200. For example, the BN insert 204 is formed with a channel 204a corresponding to the outer diameter and axial height of the wedding ring shaped excitation coil 202. During the fabrication process, the aluminum fills the channel and the center of the BN insert 204. Subsequently, the center of the BN insert 204 is drilled out with a drill bit having a diameter corresponding to the inside diameter of the coil 202, thereby forming the wedding ring shaped coil 202. The die cavity may include a pin which occupies a substantial portion of the center of the BN insert during the infiltration process so as to limit the amount of aluminum which is later drilled out.

Similarly, a slot 205 is machined in the die cast structure to form the leads to the coil 202. The width of the machined slot provides the appropriate space for a blade and associated dielectrics to be subsequently inserted to form the series resonant circuit. Other machining may be done as may be desired for particular applications. For example, the lamp head 200 includes holes 209 and is machined to receive mounting hardware 207.

Figure 6:
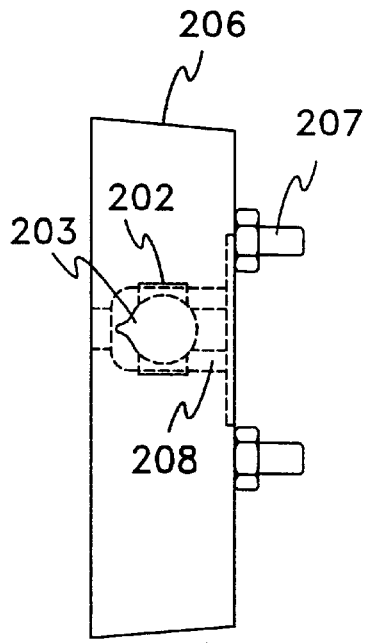
FIG. 6 is a side schematic view of the first example.
Figure 7:
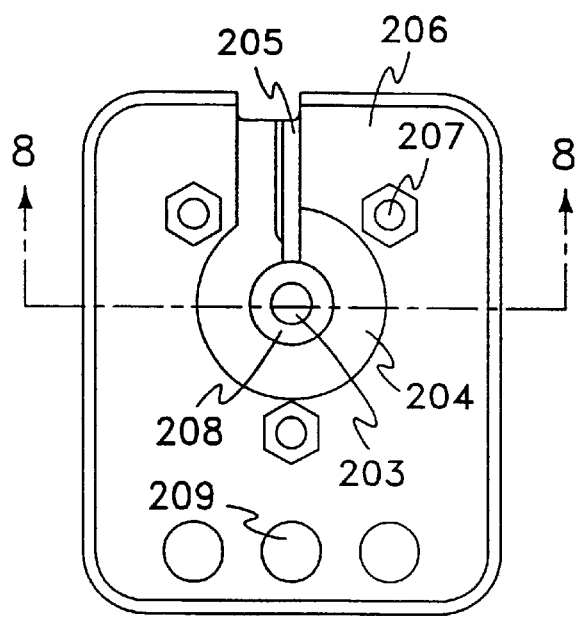
FIG. 7 is a top schematic view of the first example.
Figure 8:
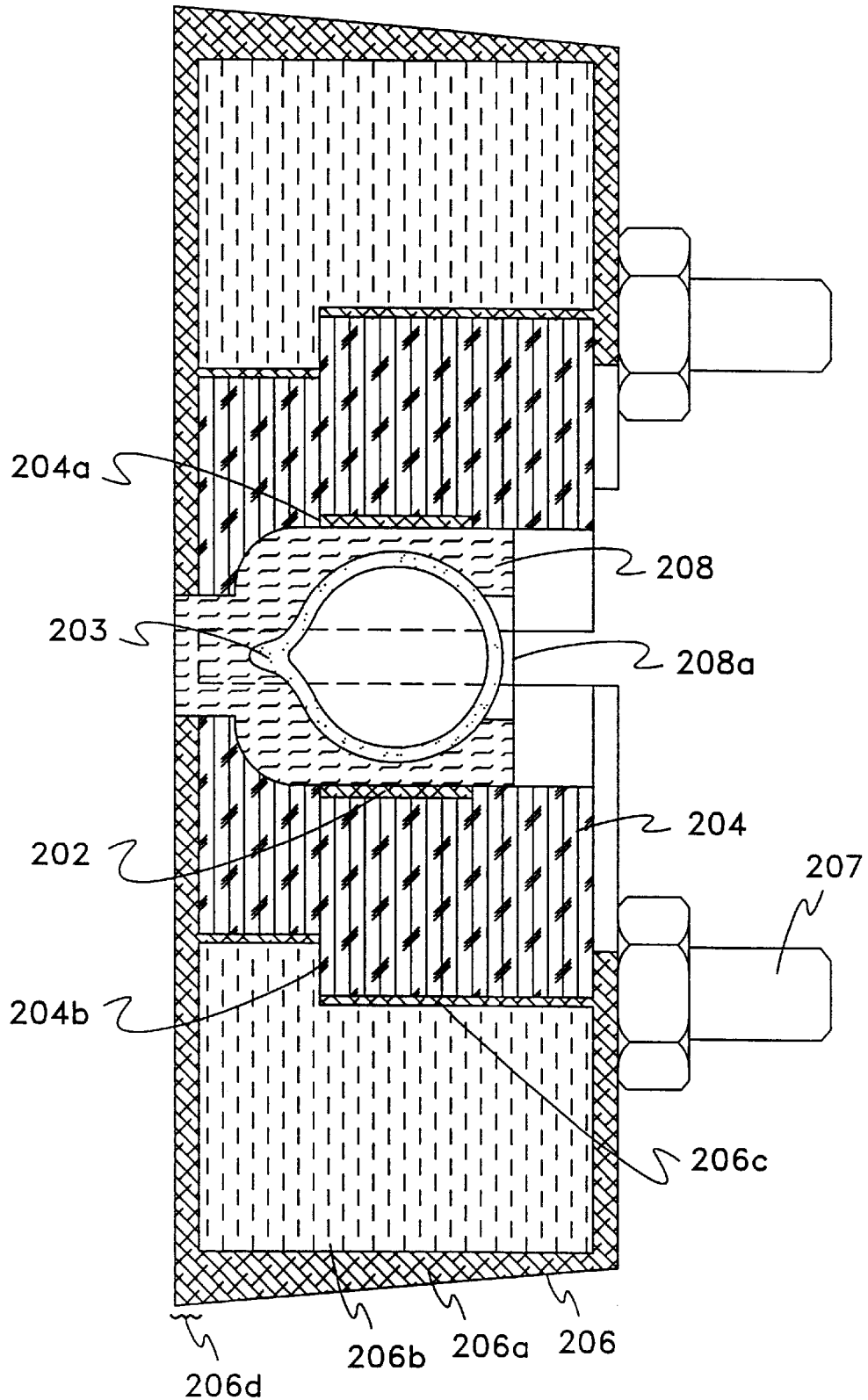
FIG. 8 is a cross sectional view taken along line 8—8 in FIG. 7.

As shown in FIGS. 6–8, a bulb 203 is encased in a reflective jacket 208 which forms an aperture 208a. The bulb 203 is approximately centered axially and radially with respect to the coil 202. The bulb 203 and jacket 208 may be manufactured, for example, as described in the parent application. In general terms, the reflective jacket 208 is formed by positioning the bulb 203 in the lamp head 200 and pouring a liquid solution of micro and nano particulate alumina and silica around the bulb 203. The solution hardens when it dries and the aperture is subsequently formed by removing some of the hardened reflective material. Alternatively, the bulb 203 may be separately encased with the reflective jacket 208 and subsequently inserted in the lamp head 200 as a unit.

In preferred examples, a bottom portion 206d of the enclosure 206 is removed (e.g. by milling or otherwise machining the die cast structure). The BN insert 204 forms a shoulder 204b with the AlSiC 206b which vertically registers the BN insert 204 during the infiltration process and secures the BN insert 204 if the bottom portion 206d is removed.

The integrated lamp head 200 provides many advantages. For example, the lamp head 200 provides a mechanically rigid physical structure to contain and protect the bulb. The lamp head 200 provides a package which is readily adapted for attachment to external optical elements. The integrated lamp head 200 also provides advantages in thermal management. The lamp head 200 provides intimate thermal contact between the coil 202 and the heatsink (e.g., BN insert 204) and between the heatsink and the lamp body (e.g., enclosure 206). Preferably, the coefficient of expansion of the coil, the heatsink, and the lamp body are matched so that intimate thermal contact is maintained during thermal cycling (e.g. lamp start up, steady state operation, and lamp shut down). Preferably, the heatsink material also provides a coefficient of thermal conduction which is suitable for operating the lamp at the desired temperature. In the present example, the coefficient of expansion of the BN insert 204 is suitably matched with the coefficient of expansion of the AlSiC 206a portion of the enclosure 206. With these materials, the lamp head 200 effectively conducts heat away from the bulb and also conducts heat away from the inductive coupling to maintain high RF efficiency of the coupling.

The integrated lamp head 200 advantageously further provides a conductive screen around the bulb and coupling circuit to reduce the radiation of RF energy to the external environment. Moreover, the lamp head 200 provides the above-described advantages in an integrated package that may be manufactured cost effectively in volume.

Figure 9:
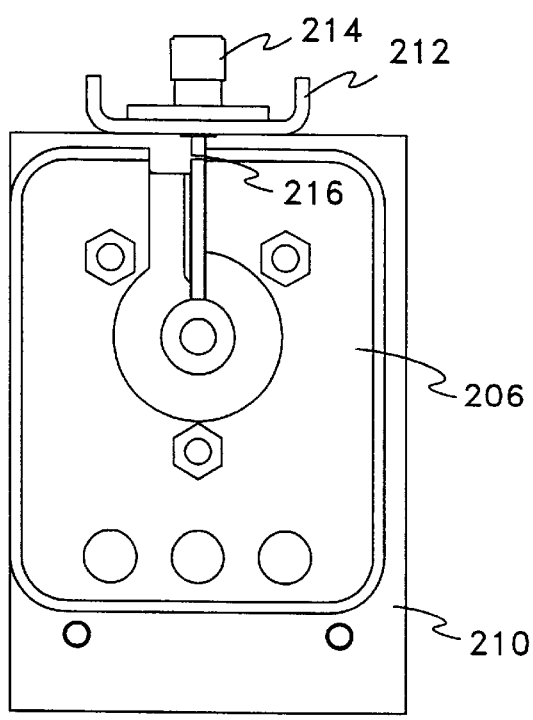
FIGS. 9–10 are top and side schematic views, respectively, of a lamp assembly utilizing the first example of the invention.
Figure 10:
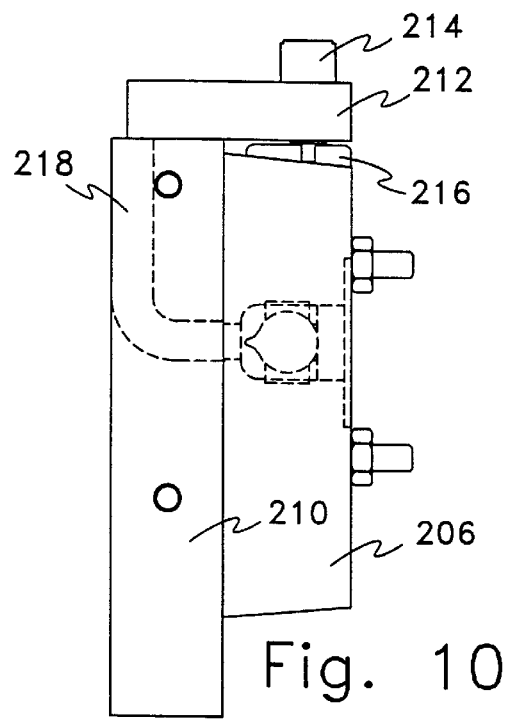
Figure 11:
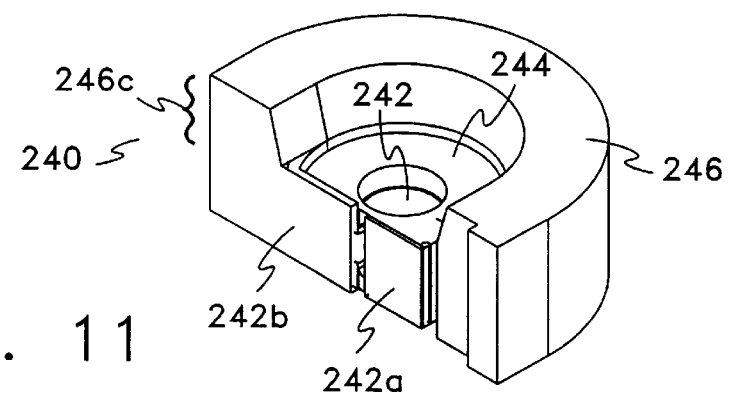
FIG. 11 is a perspective view of an integrated lamp head for a second example of the invention.
Figure 12:
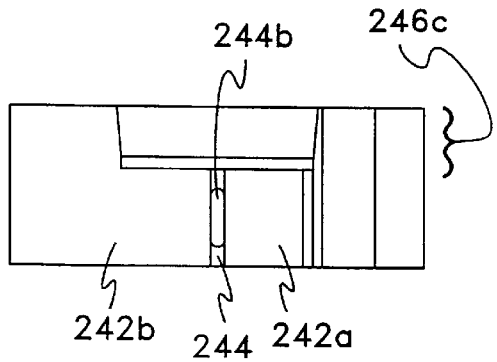
FIGS. 12–13 are front and top schematic views, respectively, of the second example.
Figure 13:
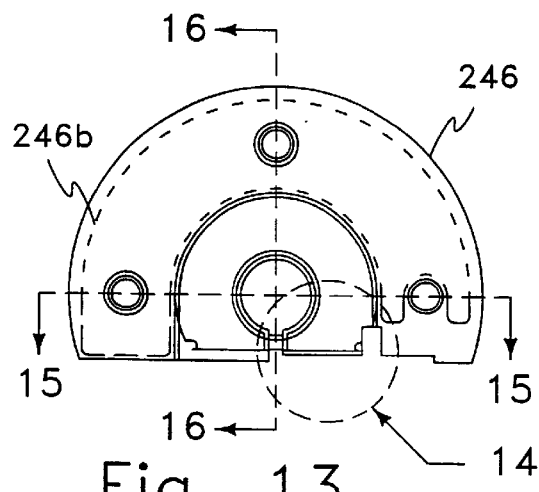

FIGS. 9–10 are top and side schematic views, respectively, of a lamp assembly utilizing the first example of the invention. The lamp head enclosure 206 is mounted on a base 210. A bracket 212 is connected to one end of the base 210 and supports a coaxial connector 214. A center conductor of the coaxial connector 214 is electrically connected to a blade 216 which extends in between the leads of the coil 202. As described in the parent application, a thin dielectric is positioned between the blade 216 and the grounded lead of the coil 202 and a relatively thicker dielectric is positioned between the blade 216 and the other lead of the coil 202.

The base 210 includes a channel 218 which accommodates a starter wire. For bulbs which are difficult to start, an insulated wire may be routed through the channel 218 so that an exposed end of the wire is positioned proximate to the bottom of the bulb. A high potential may be applied between the coil and the starter wire to generate a sufficient electric field strength to ionize the gas inside the bulb and thereby initiate the breakdown process. While a channel for a starter wire has been provided in the base 210, for most lamp configurations the use of a starter wire is not required.

Integrated lamp heads are built with coils having inner diameters ranging from about 7 mm up to about 8.5 mm, radial thicknesses ranging from about 0.15 mm up to about 0.8 mm with a preferred radial thickness being about 0.5 mm, and axial heights ranging from about 3 mm to 5 mm with about ½ the inner diameter being a preferred axial height. Bulbs are used with the integrated lamp heads typically having an outer diameter (O.D.) of about 7 mm and an inner diameter (I.D.) of about 6 mm. The bulbs are typically spherical, although some optionally have a flattened top and some are optionally pill box shaped.

While the examples of an integrated lamp head described herein relate generally to inductively coupled lamps, the integrated lamp head according to the invention may be readily adapted to provide capacitively coupled lamps, travelling wave launchers, and even microwave lamps. Other excitation structures may be integrally formed on the interior surface of the insulating ceramic to provide differently configured lamps. For example, opposed electrodes may be formed to provide a capacitively coupled lamp. Other modifications will be apparent to those skilled in the art.

With reference to FIGS. 11–16, the second example utilizes an omega coil 242 (as described in the parent application), but otherwise is similar in construction to the first example. An integrated lamp head 240 includes an enclosure 246 encasing a ceramic insert 244. A slot 244b separates the leads 242a and 242b of the omega coil 242. Overall dimensions for the lamp head 240 are approximately 31 mm wide×47 mm long×18 mm deep. From the center of the ceramic insert 244, the enclosure 246 is substantially semi-circular with a radius of about 23.5 mm. The main body of the enclosure 246 is about 11 mm deep, with an optional protruding ridge 246c about 7 mm deep. The ridge 246c is provided primarily for application interface purposes. As discussed above with respect to the first example, and as can best be seen in FIGS. 15 and 16, the enclosure 246 includes aluminum (Al) 246a and aluminum silicon carbide (AlSiC) 246b and encases a BN insert 244.

The omega coil 242 is formed according to the following process. The BN insert 244 is preformed with a shoulder 244a corresponding to the outer diameter and lower extent of the omega coil 242. The BN insert 244 further includes an opening 244c positioned centrally along the flat face of the BN insert 244. During the fabrication process, the aluminum fills the center of the BN insert 244 and the opening 244c. Subsequently, the center of the BN insert 244 is drilled out with a drill bit having a diameter corresponding to the inside diameter of the omega coil 242. The BN insert 244 is then counter-bored with a drill bit which has a diameter slightly larger than the outside diameter of the omega coil 242 to a depth corresponding to the desired height of the omega coil 242. As can best be seen in FIG. 93, the width of the machined slot 244b is less than the width of the opening 244c while the height of the machined slot 244b is taller than the height of the opening 244c. Thus, machining the slot 244b in the die cast structure forms the slot in the wedding ring shaped coil and forms the connection from the leads 242a and 242b to the coil 242.

Figure 14:
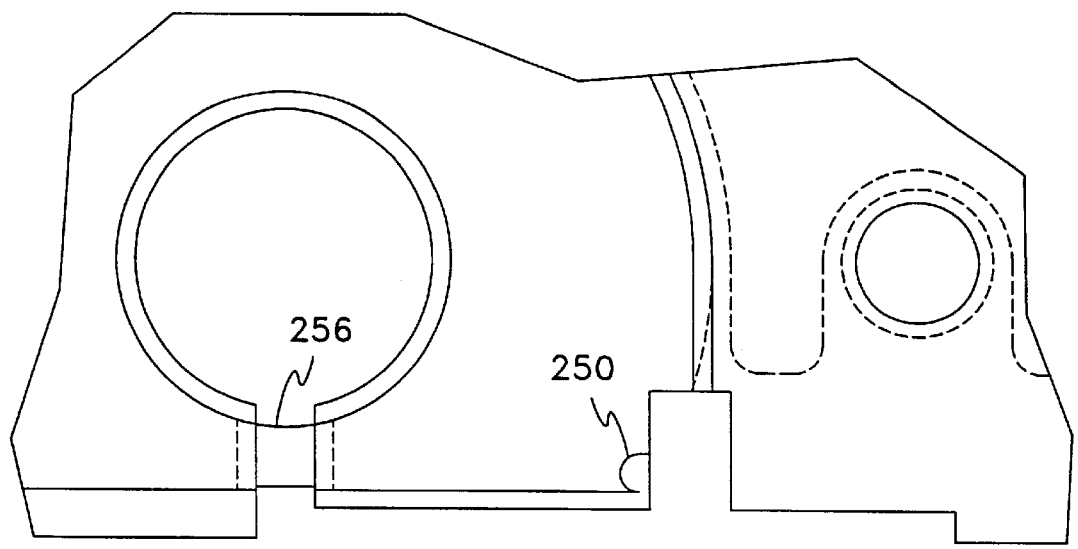
FIG. 14 is an enlarged, fragmented view of the circled area 14 in FIG. 13.
Figure 15:
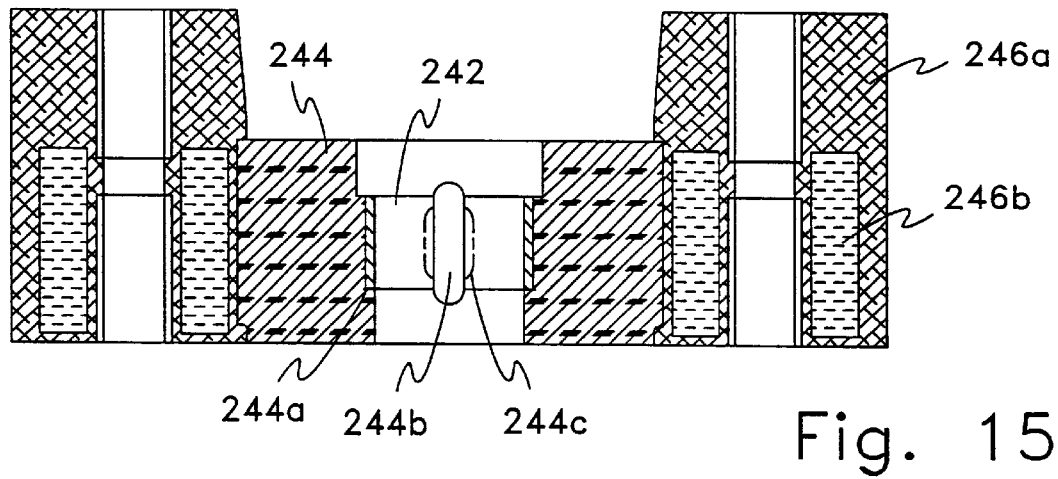
FIG. 15 is a cross sectional view of the second example taken along line 15—15 in FIG. 13.
Figure 16:
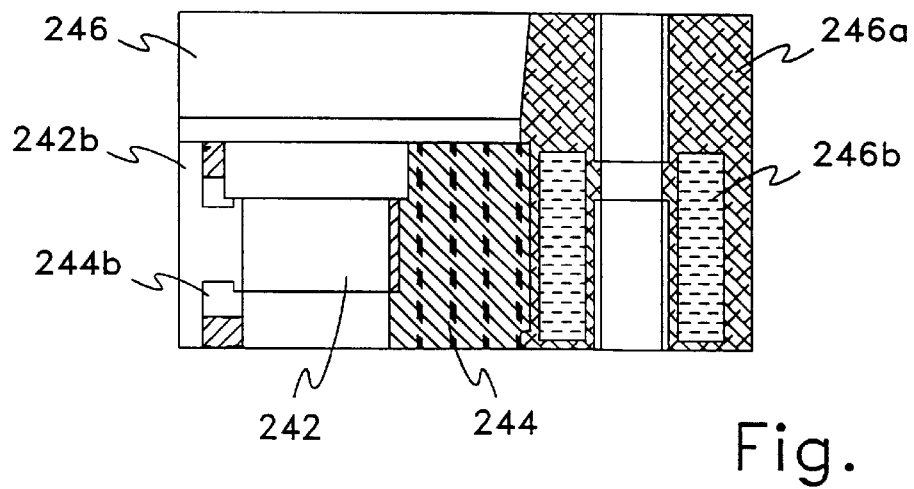
FIG. 16 is a cross sectional view of the second example taken along line 16—16 in FIG. 13.
Figure 17:
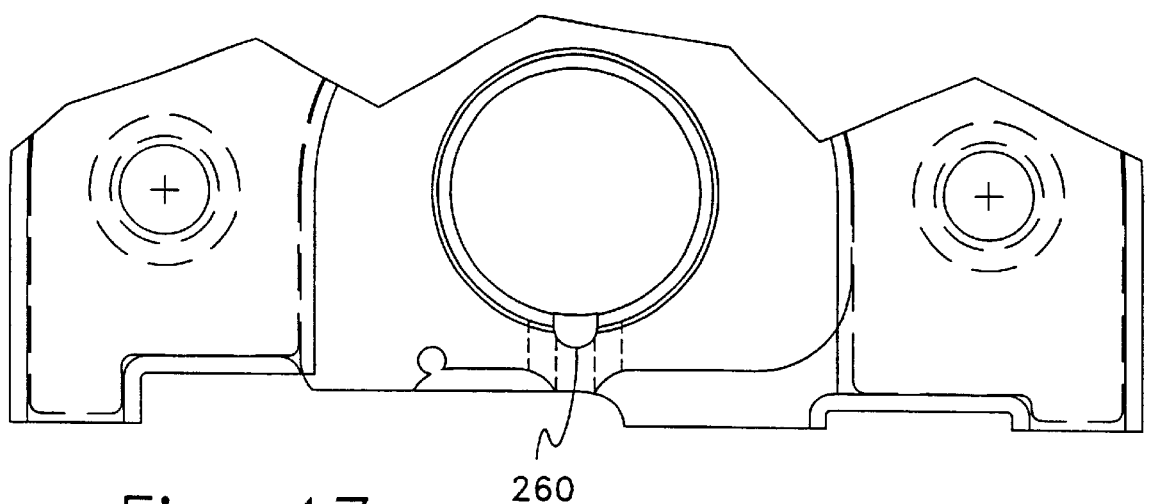
FIG. 17 is an enlarged, fragmented view of the lamp head.
Figure 18:
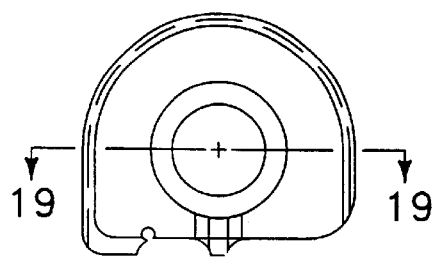
FIG. 18 is a schematic view of a BN insert with pre-formed coil connections.
Figure 19:
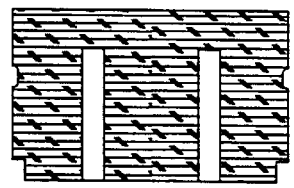
FIG. 19 is a cross sectional view of the BN insert taken along line 19—19 in FIG. 18.
Figure 20:
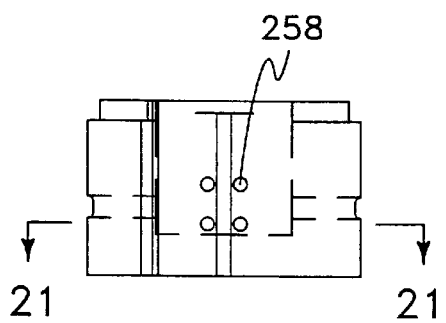
FIG. 20 is a schematic view of the BN insert showing the location of pre-drilled holes used to form a peg-type connection to the coil.
Figure 21:
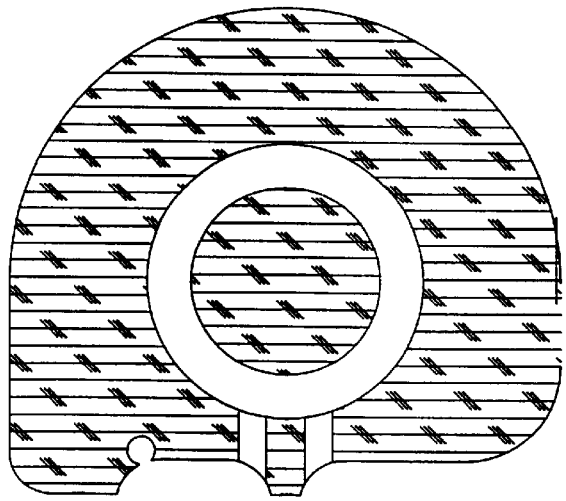
FIG. 21 is a cross sectional view taken along line 21—21 in FIG. 20.

FIG. 14 illustrates a feature of the invention referred to as a locking pin 250. The BN insert 244 is formed with a recess which fills with aluminum and solidifies during the fabrication process. The aluminum solidified in the recess forms a locking pin 250 which helps prevent the lead 242a from separating from the BN insert 244.

Preferably, the integrated lamp head 240 is used with a bulb encased in a reflective jacket and with bulb fills as described in the parent application.

In the above-described second example, after infiltration of the aluminum and subsequent cooling, the coil connection is accomplished by milling a slot 244b through the BN insert to make blade-type connections on each side of the wedding ring shaped coil and isolate the high voltage plate from the ground plate. This leaves a relatively thin section 256 of the BN insert (see FIG. 14).

According to the present aspect of the invention, the BN insert is made relatively stronger in the area of the coil connection by pre-forming the coil connection in the BN insert to avoid subsequent milling. For example, peg-type connections to the coil may be utilized instead of blade-type connections.

With reference to FIGS. 17–21, four holes 258 are drilled in the BN insert prior to infiltration with the aluminum metal. Once the casting process is complete, the wedding ring shaped coil is separated by drilling a hole partially through the BN insert in an area 260 (see FIG. 17). Thus, the relatively thin area is eliminated and the BN insert is made relatively stronger. This approach also improves manufacturability because less machining is required after the casting process is complete.

As noted in the parent application in connection with the split coil examples, using two pegs instead of a single blade does not significantly affect circuit performance because most of the current spreads to the outside of the conductive elements.

Figure 22:
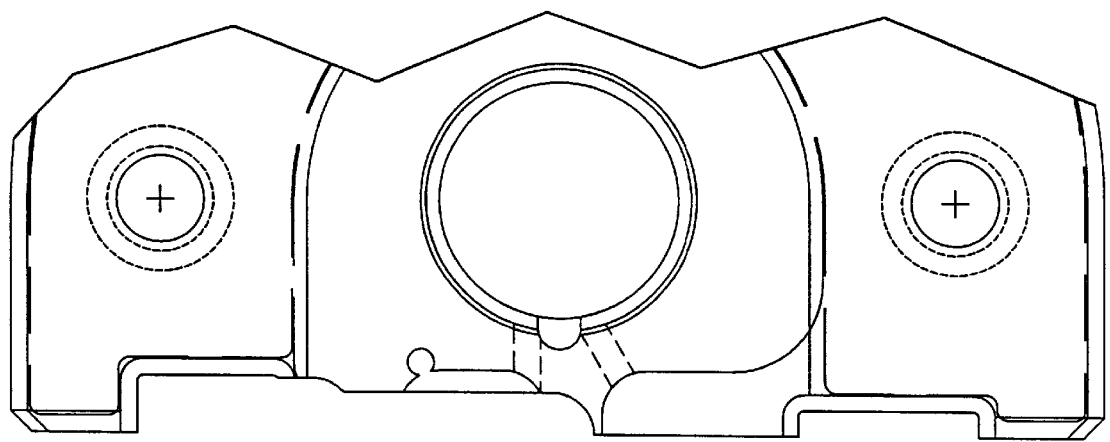
FIGS. 22 and 23 are enlarged, fragmented views of the lamp head showing alternative arrangements for the pegs.
Figure 23:
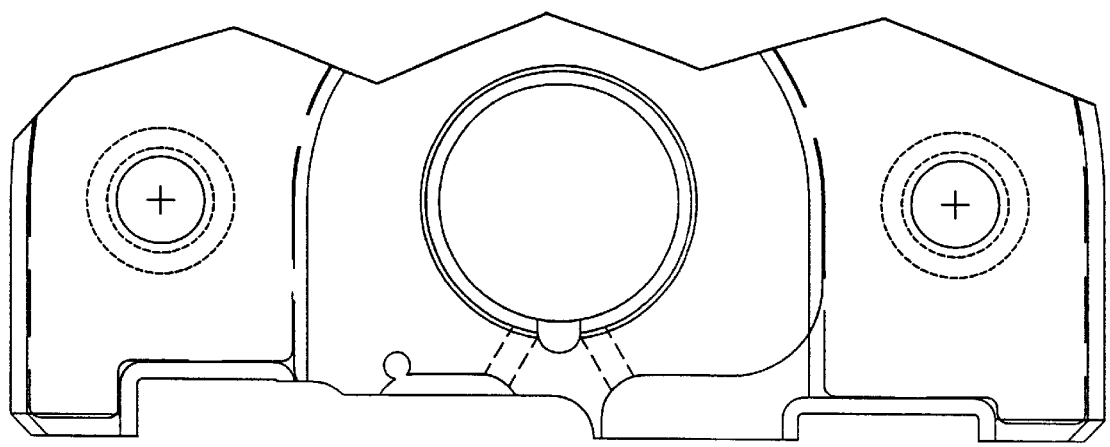
Figure 24:
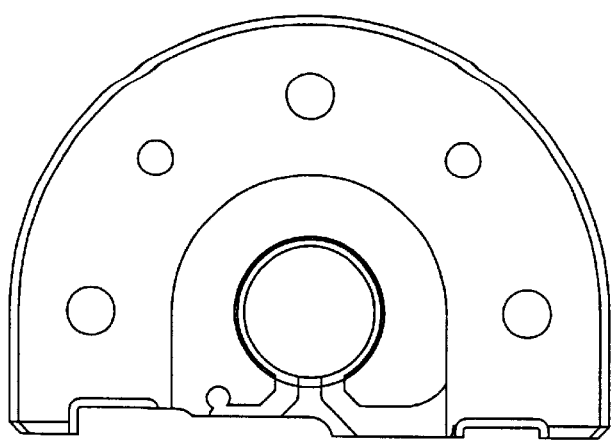
FIGS. 24–28 are schematic and perspective views, respectively, of an alternative lamp head and BN insert which is pre-formed to provide blade-type connections.
Figure 25:
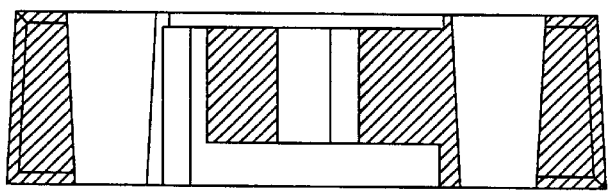
Figure 27:
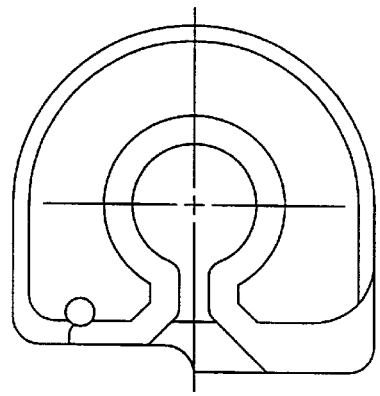
Figure 26:
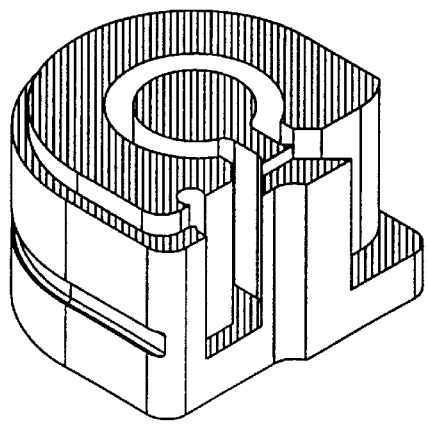
Figure 28:
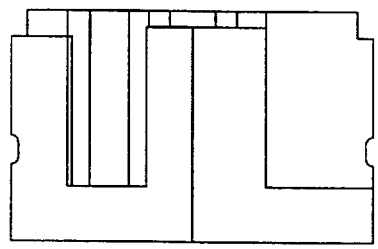

As shown in FIGS. 22 and 23, angled pegs may also be utilized for one or both of the connections. Using angled pegs allows greater separation between the high voltage plate and the various electrically grounded surfaces of the lamp head to further reduce the possibility of arcing therebetween. Also, while the illustrated examples utilize round pegs, any suitable shape may be used (e.g. square, rectangular, elliptical).

Also, the BN insert may alternatively be pre-formed with blade-type connections, as shown in FIGS. 24–28. Because the later milling step is avoided, the BN insert is still relatively stronger as compared to the example shown in FIGS. 11–16.

Figure 29:
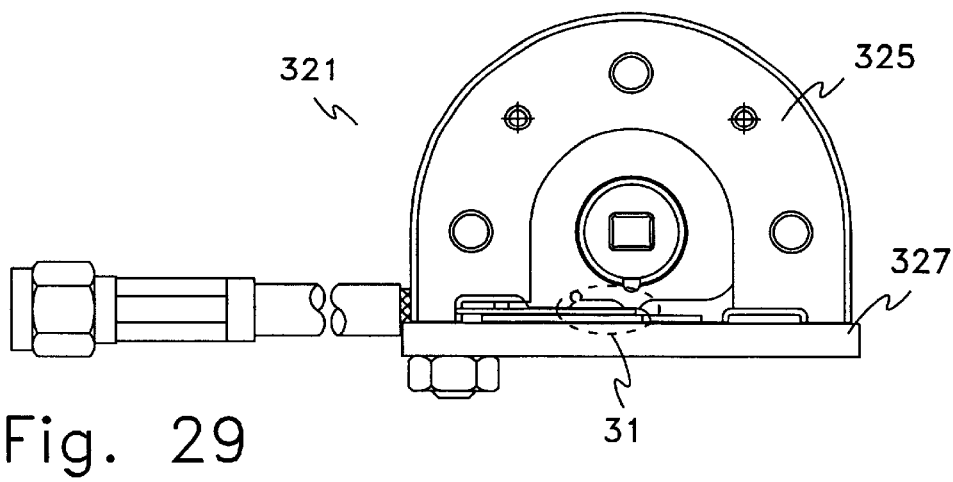
FIGS. 29 and 30 are schematic views of a lamp head/power feed assembly.
Figure 31:
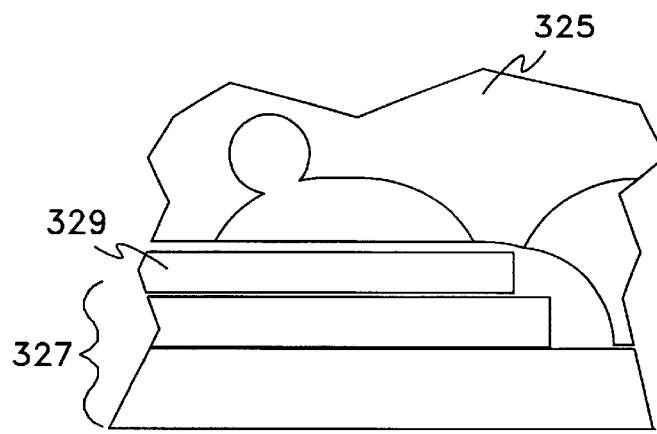
FIG. 31 is an enlarged, fragmented view of the area 31 in FIG. 29.
Figure 30:
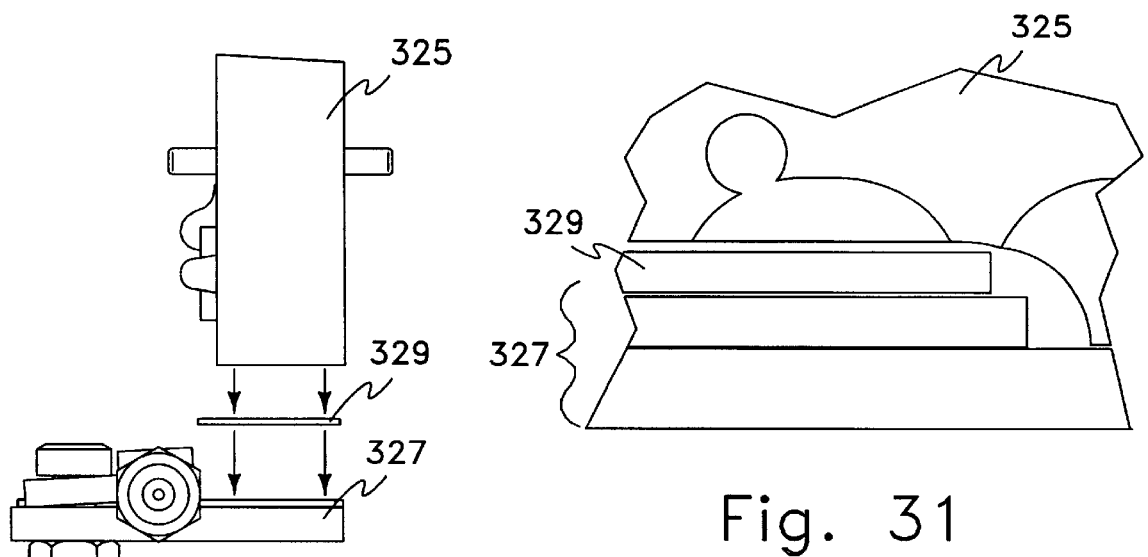

FIGS. 29 and 30 are schematic views of a lamp head/power feed assembly. A lamp head 325 is mounted on a power feed assembly 327. A capacitor assembly 329 is positioned between a high voltage plate of the lamp head 325 and a power feed pad of the power feed assembly 327. FIG. 31 is an enlarged, fragmented view of the area 31 in FIG. 29, showing the relative positioning of the capacitor assembly 329 with respect to the lamp head 325 and the power feed assembly 327. Further details regarding the construction of the lamp head 325, the power feed assembly 327 and the lamp 321 are discussed in the parent application.

Figure 32:
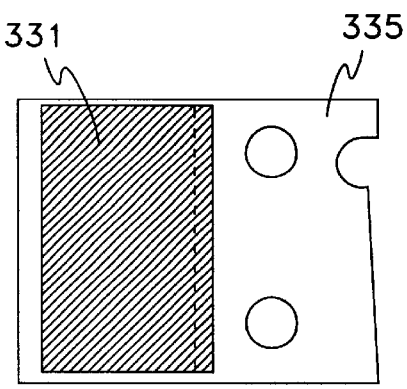
FIGS. 32 and 33 are schematic views of opposite sides of a capacitor assembly according to one aspect of the invention.
Figure 33:
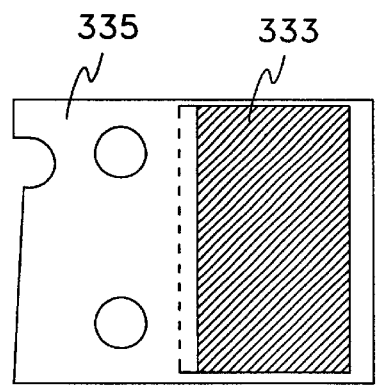

FIGS. 32 and 33 are schematic views of opposite sides of the capacitor assembly 329. Conductive pads 331 and 333 are disposed on opposite sides of a dielectric material 335. For example, capacitor assembly 329 may comprise a printed circuit board having a dielectric material made of a Teflon® composite and clad with copper plating for the conductive pads. The thickness of the dielectric material 335 and the size of the conductive pads 331, 333 are selected to provide a desired capacitance value.

Figure 34:
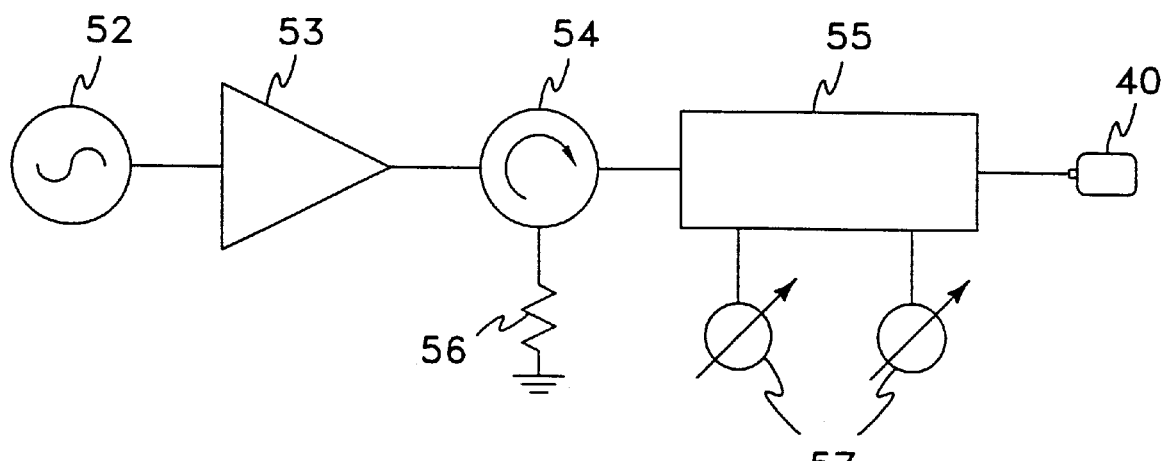
FIG. 34 is a schematic diagram of a system for operating and evaluating the lamps described herein.

FIG. 34 is a schematic diagram of a system for operating and evaluating the lamps described herein. A high frequency signal source 52 is connected to an amplifier 53. The output of the amplifier 53 is connected to a circulator 54, which is connected through a directional coupler 55 to the lamp 40. The circulator 54 shunts reflected power to a load 56. The directional coupler 55 provides a plurality of taps which may be connected to measurement devices 57.

The above described device is operated, for example, at 915 MHz with 30–100 watts of power supplied by an amplifier made by Communication Power Corporation, Brentwood, N.Y., Model No. 5M-915-1,5E2 OPT 001, connected by a coaxial cable to a Hewlett-Packard Network Analyzer Model No. 8505A. The circulator and directional coupler employ commercially available components. The output of the directional coupler is connected to the input connector 41 via a coaxial cable. Some examples of the inductively coupled lamp produce up to approximately 80 lumens per watt (i.e. approximately 8000 lumens with 100 watts of power).

The above-described device is powered by any suitable power source capable of providing a suitable level of power at high frequency. For example, a magnetron may be used as the power source. Preferably, the microwave power from the magnetron would be coupled through an impedance matching device into a coaxial cable for supplying the power to the device.

Figure 35:
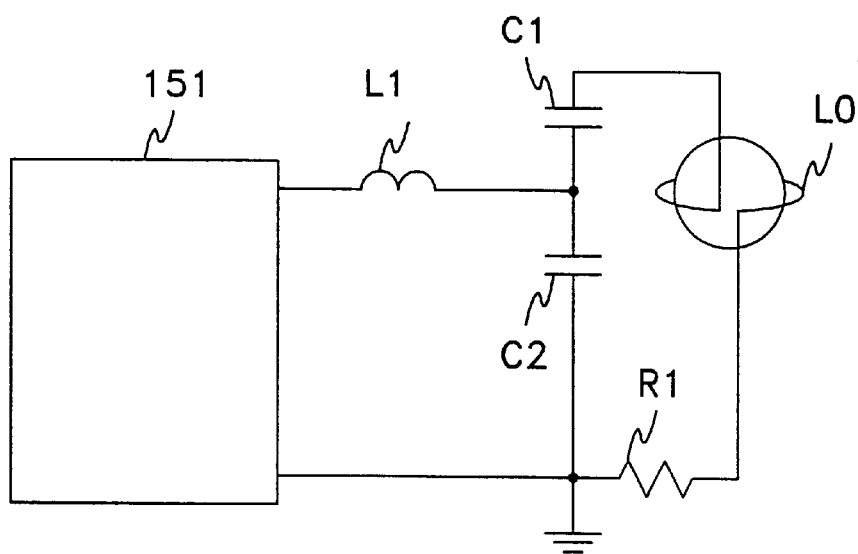
FIG. 35 is a schematic diagram of the lamp circuit.

FIG. 35 is a schematic diagram of an electrodeless lamp circuit which utilizes either the first or second examples of the invention. The series resonant circuit includes two capacitors C1 and C2 connected in series with each other and connected in series with a series resonant coil L0. A power source 151 provides a high frequency signal through a small inductance L1 to the junction of C1 and C2. The other side of C1 is grounded. The series resonant coil L0 is also connected to ground through a small resistance R1, which represents the lumped circuit resistance.

During operation, the circuit operates as a series resonant circuit, in which L0 is the series resonant inductor and both C1 and C2 operating together are the series resonant capacitor. In other words, the two capacitors C1 and C2 tied together in series effectively provides one series resonance capacitance C0. The capacitor C0 and the inductor L0 together form the series resonant circuit, which during operation has a ringing current. Power is supplied to the series resonant circuit in the form of a high frequency alternating current. As the power continues to be supplied, the energy moves between the capacitors, C1 and C2, and the coil L0 in an alternating manner. There are inevitable losses in the circuit, represented by R1 in FIG. 68. The energy (power) supplied to the series resonant circuit replenishes the losses, and the series resonant circuit continues to ring.

The lamp is considered to operate at the applied input power frequency. In other words, the system operates at the power source frequency, assuming that the power source frequency is sufficiently close to the actual series resonant circuit frequency. During operation, the bulb plasma reflects a certain amount of resistance back into the circuit and there is some natural resistance (represented collectively by R1). The actual resonant frequency of the series resonant circuit need not exactly match the power source frequency. The resonant frequency is preferably about the same as the power source frequency, taking into account the Q of the circuit with the circuit loaded (i.e. with an operating bulb). Depending on the Q of the circuit, the range of effective operating frequencies may be relatively wide. In other words, the circuit may operate off actual resonance and still operate efficiently (i.e. fairly well matched and fairly well working).

Referring back to FIGS. 9 and 10, during operation of the first example of the invention, high frequency power is brought in through the connector 214 and is supplied through the blade 216 to the series resonant circuit. The blade 216 is a relatively low current carrying element, compared to the rest of the circuit, and has a small inductance (i.e. included in L1 along with the connector lead). The blade 216 feeds energy into the series resonant circuit as the energy is dissipated through the coil (i.e. L0) and other lossy elements in the circuit. For example, some energy is lost in operation, mostly by resistance (i.e. R1). A small amount of energy may also be lost by radiation. The ringing current passes around the coil and through the first capacitor and the second capacitor. Preferably, the first capacitor (i.e. C1) provides a low voltage and a high capacitance and the second capacitor (i.e. C2) provides a high voltage and low capacitance. Further details of the lamp circuit operation may be had by reference to the parent application.

Figure 36:
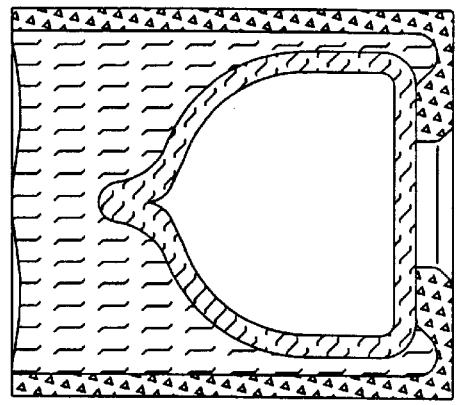
FIG. 36 is a cross sectional view of an example aperture cup.

FIG. 36 is a cross sectional view of an example aperture cup. The bulb is inserted in a reflective ceramic cup and positioned approximately symmetric with respect to the aperture. The cup is then filled with a reflective material which hardens to encase the bulb and secure the bulb in position. Other details of bulb and aperture forming processes are described in the parent application. Preferably, the reflective cup and the reflective material are low dielectric/ high (relative) thermal conducting materials to aid in thermal management of the lamp.

Figure 37:
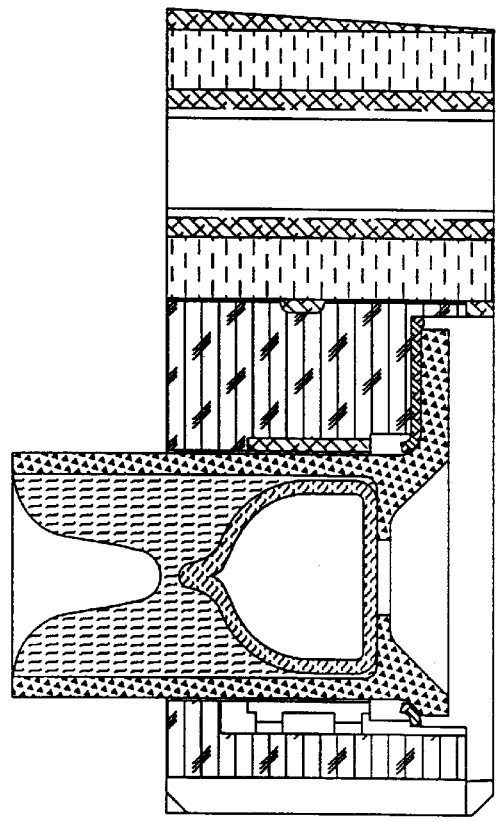
FIG. 37 is a cross-sectional view of an integrated lamp head according to the invention utilizing a flanged aperture cup.

FIG. 37 is a cross-sectional view of an integrated lamp head according to the invention utilizing a flanged aperture cup. Preferably, the BN insert is counter-bored to mate with the flange portion to provide axial, radial, and rotational alignment of the cup, and to promote heat transfer away from the bulb. Thermal putty is applied between the flange cup and the BN insert around an outer periphery of the flange.

According to another aspect of the present invention, the lamp head is mounted directly on the same printed circuit board as the RF oscillator circuitry. In some examples, the printed circuit board in mechanically and electrically connected to a metal plate, referred to as a spreader plate, which has an opening under the printed circuit board in the area of the lamp head in order to allow the printed circuit board to flex in response to thermal forces.

Figure 38:
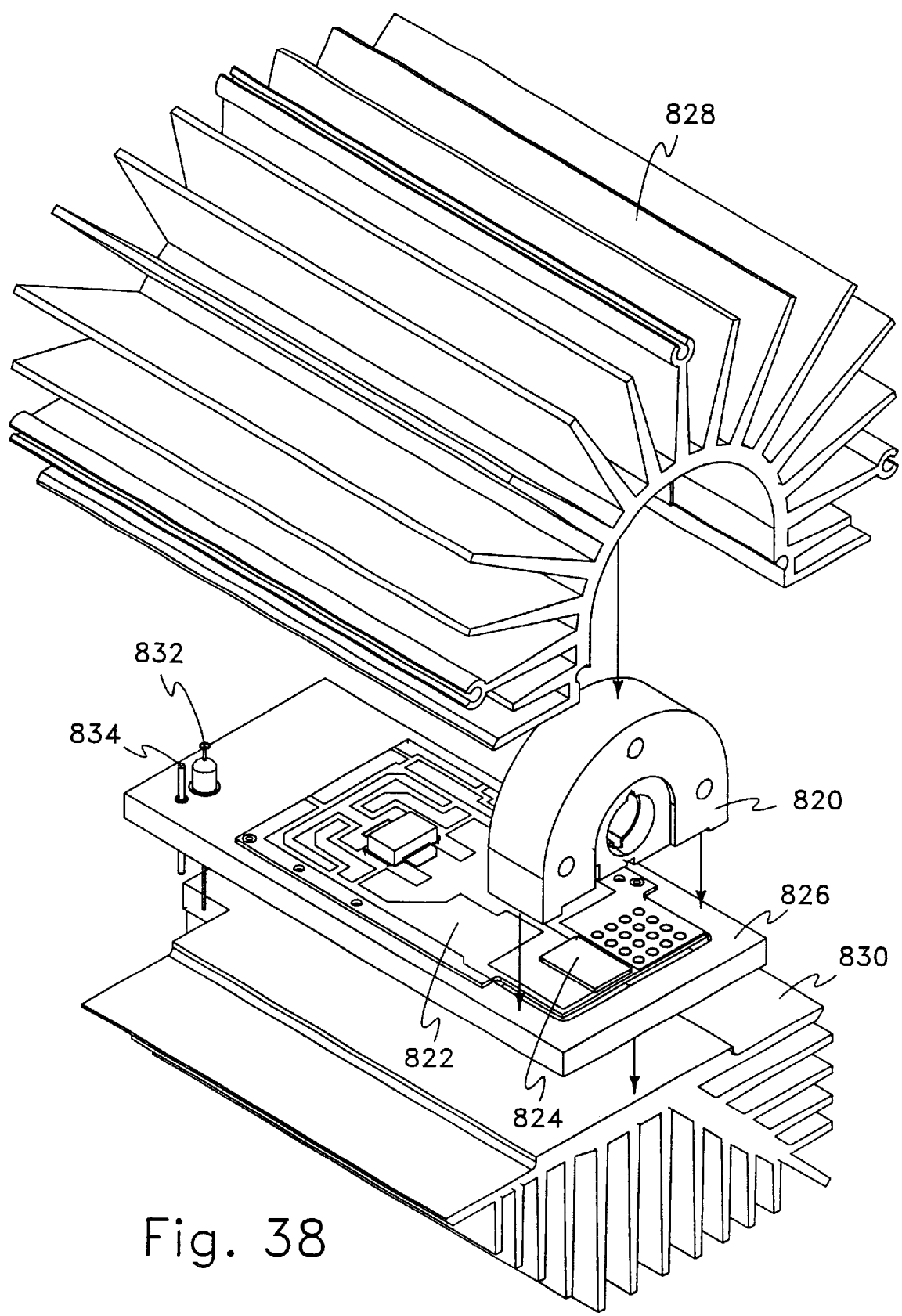
FIG. 38 is an exploded, perspective view of an example of a high brightness lamp utilizing an integrated lamp head according to the present invention.

FIG. 38 is an exploded, perspective view of an example of a high brightness lamp which utilizes an integrated lap head according to the present invention. A lamp head 820 is mounted on an oscillator board 822. A suitable dielectric material 824 is positioned between a high voltage plate of the lamp head 820 and a pad on the oscillator board 822. The oscillator board 822 is mechanically and electrically connected to a metal plate 826, hereinafter referred to as a spreader plate 826. A ground plate of the lamp head 820 is mechanically and electrically connected to a ground pad on the oscillator board 822. A perimeter portion of the lamp head 820 is also mechanically and electrically connected to the spreader plate 826. The lamp head 820 and oscillator board 822 are enclosed by a first heatsink 828 and a second heatsink 830. Power is supplied to the oscillator board 822 from an insulated pin 832 and a ground pin 834.

The lamp head 820 is constructed as described in detail above in connection with FIGS. 11–16. As illustrated in FIG. 38, the lamp head 820 omits the optional protruding ridge. The oscillator board 822 is constructed as described in detail in the parent application, including the addition of the ground pad and power feed pad for connecting to the lamp head 820.

Figure 39:
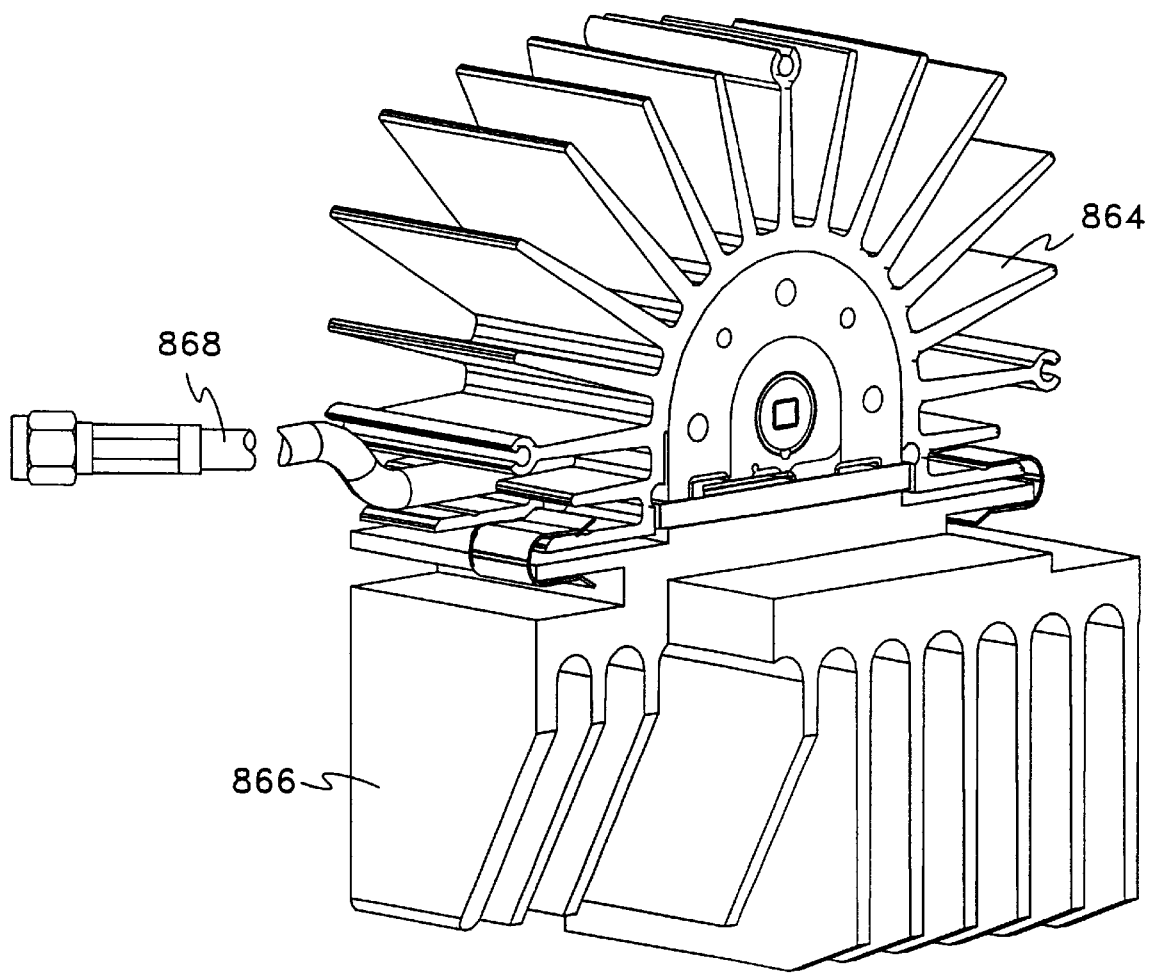
FIG. 39 is a perspective view of an alternative housing for the lamp head.

FIG. 39 is a perspective view of an alternative housing for the lamp head. The housing includes heatsinks 864 and 866 which are relatively shorter as compared to heatsinks 828 and 830. RF power is provided to the lamp head via a coaxial cable 868 from any suitable source of RF energy. Advantageously, the lamp head assembly is smaller and may be located remote from the RF source. Further details regarding the construction and operation of this lamp head housing assembly may be had with reference to the parent application.

Figure 40:
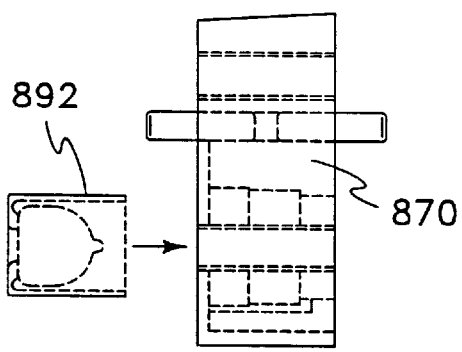
FIG. 40 is an exploded schematic view of the lamp head.
Figure 41:
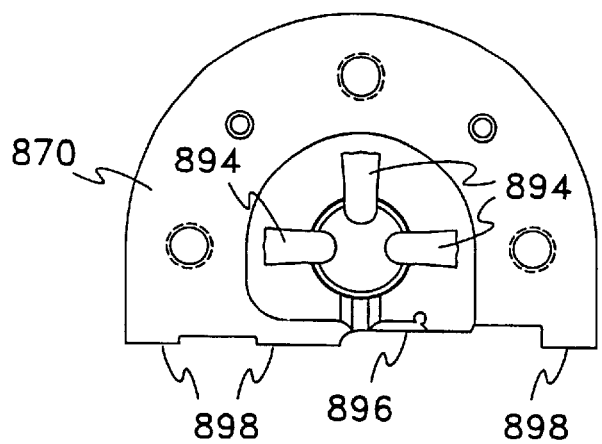
FIGS. 41–42 are schematic views of the lamp head from opposite sides.
Figure 42:
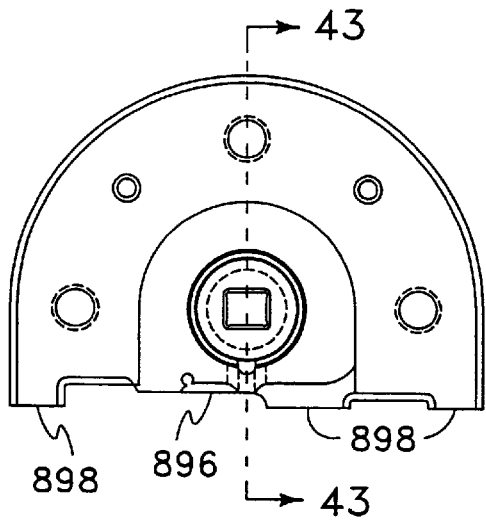
Figure 43:
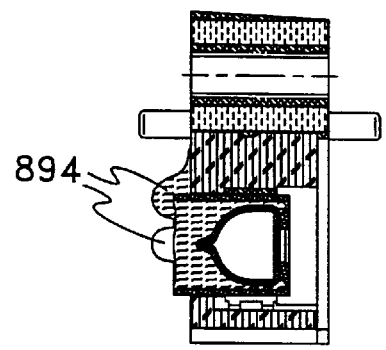
FIG. 43 is a cross sectional view taken along line 43—43 in FIG. 42.
Figure 44:
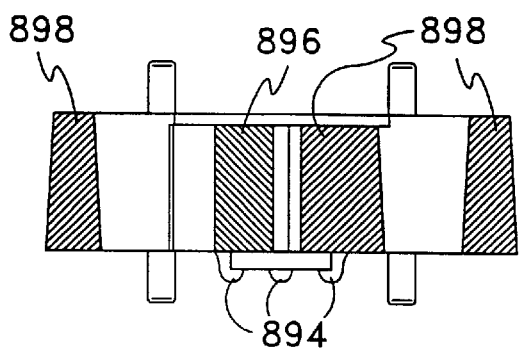
FIG. 44 is a schematic view of a side of the lamp head which is mounted to the power feed assembly.

FIG. 40 is an exploded schematic view of another example integrated lamp head. An aperture cup 892 (enclosing a bulb) is inserted in an opening in the lamp head 870. With reference to FIGS. 40–44, the aperture cup 892 is positioned in the lamp head with the bulb aligned with the wedding ring shaped coil. The aperture cup 892 is secured in this position with a high temperature adhesive 894 on the outside of the lamp head 870. Securing the aperture cup 892 from the outside of the lamp head 870 aids in thermal management of the lamp. The lamp head 870 has a high voltage plate 896 and ground plates 898 which are electrically connected to the high voltage pad 876 and spreader plate 880, respectively, of the power feed assembly 872.

Any of a number of techniques may be utilized for effecting an electrical connection between the lamp head and the printed circuit board (PCB)/spreader plate assembly. Preferably, the lamp head has a coating of Babbit metal applied to the high voltage pad and ground pads to assist soldering and mechanical attachment to the PCB assembly. The lamp head connection pads are preferably grit blasted just prior to spray coating of the Babbit metal.

One method according to the invention is to place solder in the area of the desired connection and then heat the lamp head and PCB assembly to about 200° C., for example, with a heating plate. The lamp head is then manually placed in the appropriate location and the parts cool together to form a bond.

Another exemplary method for forming an electrical connection between the lamp head and the PCB assembly is as follows. Solder is pre-applied to the lamp head and/or PCB assembly. The lamp head is placed on the PCB assembly and a high amperage current is run through the lamp head and PCB assembly in the area of the lamp head connection. High heat is generated at the contact areas, causing the pre-applied solder to melt. The current is then removed and a bond forms as the parts cool. For example, a clamping fixture is used which holds the lamp head and PCB assembly together. The clamping fixtures includes oppositely disposed carbon electrodes through which the high amperage current is passed. The current heats the carbon electrodes which in turn heats the lamp head and PCB assembly. This method has the advantage of heating only a portion of the PCB assembly, thereby avoiding reflow of solder on other parts of the PCB assembly. This method is also faster because only a portion of the PCB assembly needs to be heated.

According to a present aspect of the invention, the lamp head includes conductive inserts in the area(s) of the high voltage pad and/or ground pads which improve solderability as compared to integral aluminum pads. Preferably the insert is selected from materials which will not melt in the presence of molten aluminum. More preferably, the selected material will form a metallurgical bond between the insert and the aluminum portion of the lamp head. Also, the selected material preferably exhibits an improved solderability for connection to copper areas on the PCB assembly.

For example, suitable materials include nickel, nickel plated with platinum, and nickel alloyed with a small amount (e.g. less than about 25%) of iron.

FIG. 45 is a schematic, top view of an integrated lamp head 950 according to the present aspect the invention. FIG. 46 is a schematic, front view of the lamp head 950. The lamp head 950 includes an insert 951 in an area of a high voltage pad of the lamp head 950 and inserts 952a, 952b, and 952c in respective areas of ground pads of the lamp head 950.

As described above, the lamp head 950 is integrally formed through a vacuum injection molding process. The mold, BN insert, and/or silicon carbide pre-form are adapted to retain the pad inserts in position during the molding process. FIG. 47 is an enlarged, fragmented, cross-sectional view of the insert 951 positioned in a mold 954 prior to infiltration of the aluminum. The insert 951 is further positioned by the BN insert 956. For the high voltage pad insert 951, one end of the insert 951 will make electrical connection with the peg(s) 958 which connects to the excitation coil. The lamp head 950 may be machined, for example, along line 960–960 to expose an inner portion of the pad material.

FIG. 48 is an enlarged, fragmented, cross-sectional view of the insert 952a positioned in the mold 954 prior to infiltration of aluminum. The insert 952a is held in place by the silicon carbide pre-form 962.

Figure 49:
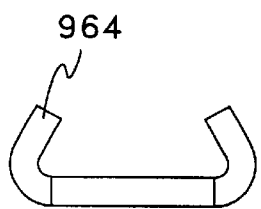
FIGS. 49–51 are schematic and perspective views, respectively of an insert with shortened leg segments.
Figure 50:
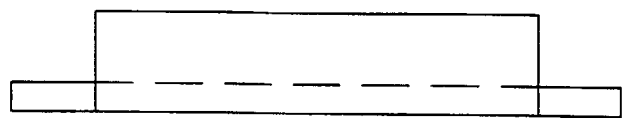
Figure 51:
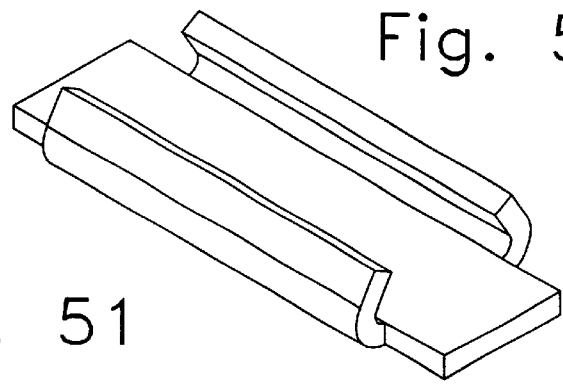
Figure 52:
FIGS. 52–54 are schematic and perspective views, respectively, of an insert with through holes.
Figure 53:
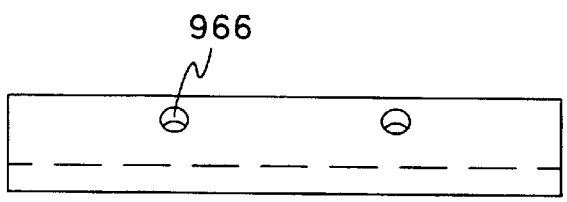
Figure 54:
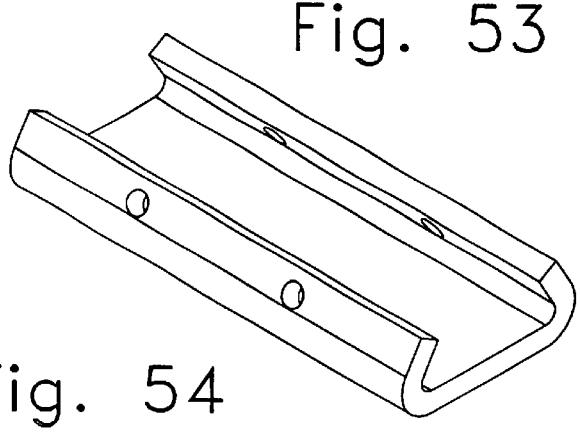
Figure 55:
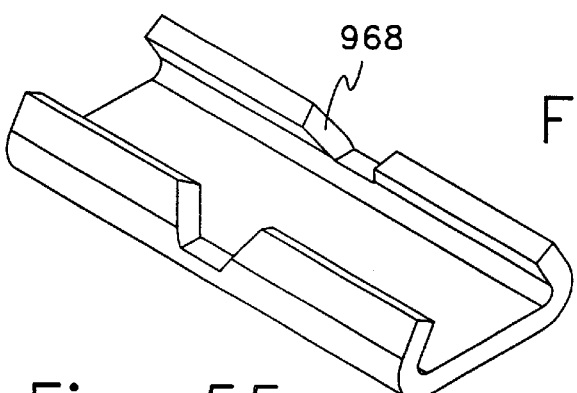
FIG. 55 is a perspective view of an insert with notches.

The inserts 951 and 952a–c may be of any suitable shape and may be of uniform longitudinal cross-section. Alternatively, the inserts may have a non-uniform longitudinal cross-section to aid retention during the molding process and/or in the finished integrated lamp head. FIGS. 49–51 are schematic and perspective views, respectively of an insert with shortened leg segments 964. FIGS. 52–54 are schematic and perspective views, respectively, of an insert with through holes 966. FIG. 55 is a perspective view of an insert with notches 968.

While the invention has been described with respect to specific examples, the invention is not so limited. Based on the drawings, the detailed description, and the teachings set forth herein, numerous other examples will occur to those skilled in the art. The preceding examples should be considered as illustrative only, with the scope and spirit of the invention being set forth in the following claims.

What is claimed is:

1. An integrated lamp head for an electrodeless lamp, the integrated lamp head comprising:

a metal-matrix composite enclosure;

an insulating ceramic encased by the metal-matrix enclosure, the insulating ceramic having an interior surface; and an excitation structure integrally formed on the interior surface of the insulating ceramic.

2. The integrated lamp head as recited in claim 1, wherein the integrally formed excitation structure comprises an excitation coil.

3. The integrated lamp head as recited in claim 1, wherein the integrally formed excitation structure comprises a wedding ring shaped excitation coil.

4. The integrated lamp head as recited in claim 1, wherein the integrally formed excitation structure comprises a cross-sectional shape generally corresponding to the upper-case Greek letter omega.

5. The integrated lamp head as recited in claim 1, wherein the integrally formed excitation structure comprises a pre-formed connection from an exterior portion of the integrated lamp head to the excitation structure.

* * * * *